No. 668,461. Patented Feb. 19, 1901.
E. & H. V. SCHROEDER.
PORTABLE GRAIN DUMP AND ELEVATOR.
(Application filed Nov. 16, 1900.)
(No Model.) 3 Sheets—Sheet 1.
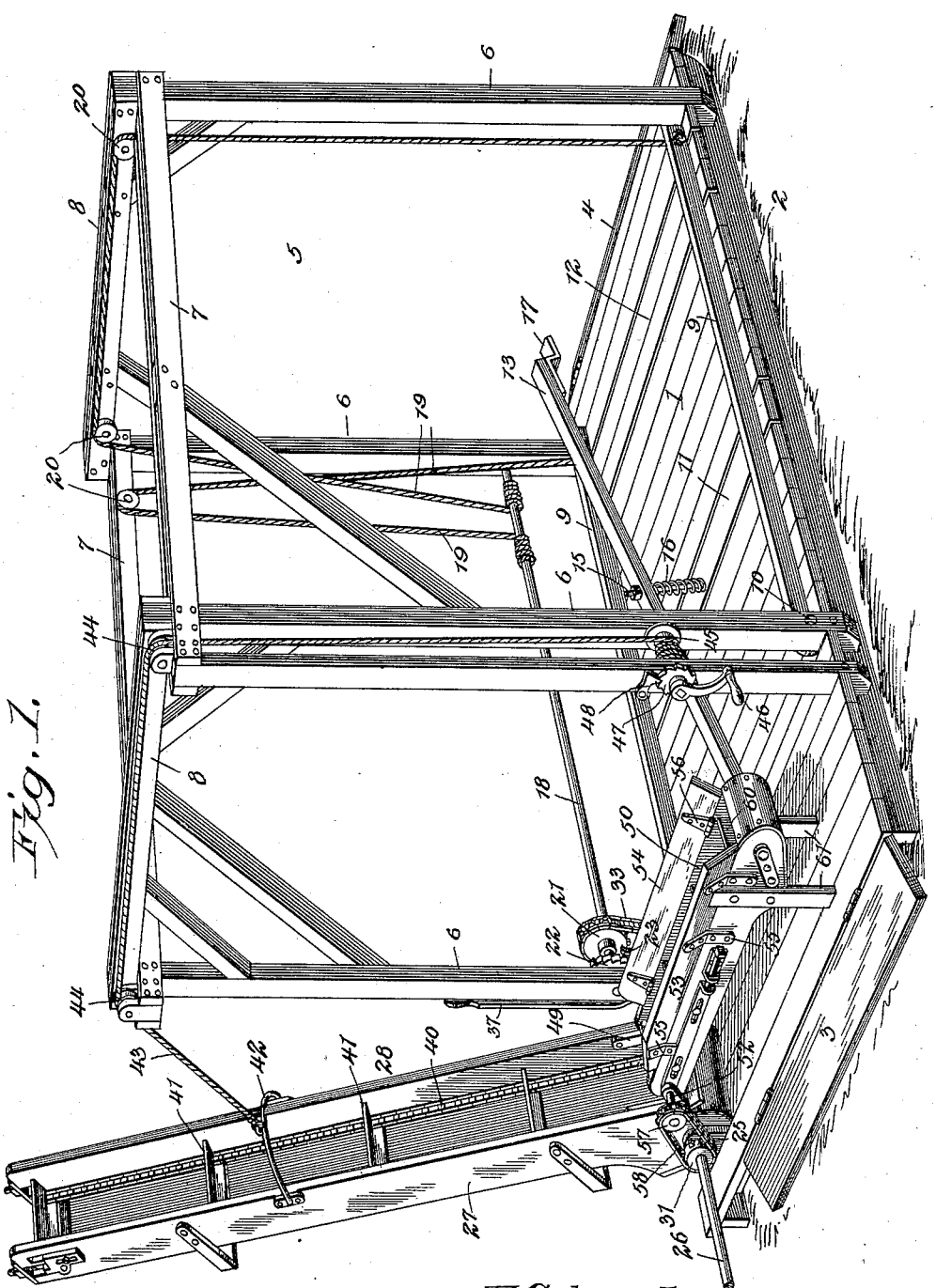
Witnesses
Howard D. Orr,
J. W. Garner
E. Schroeder,
H. V. Schroeder, Inventors
by C. A. Snow & Co.
Attorneys

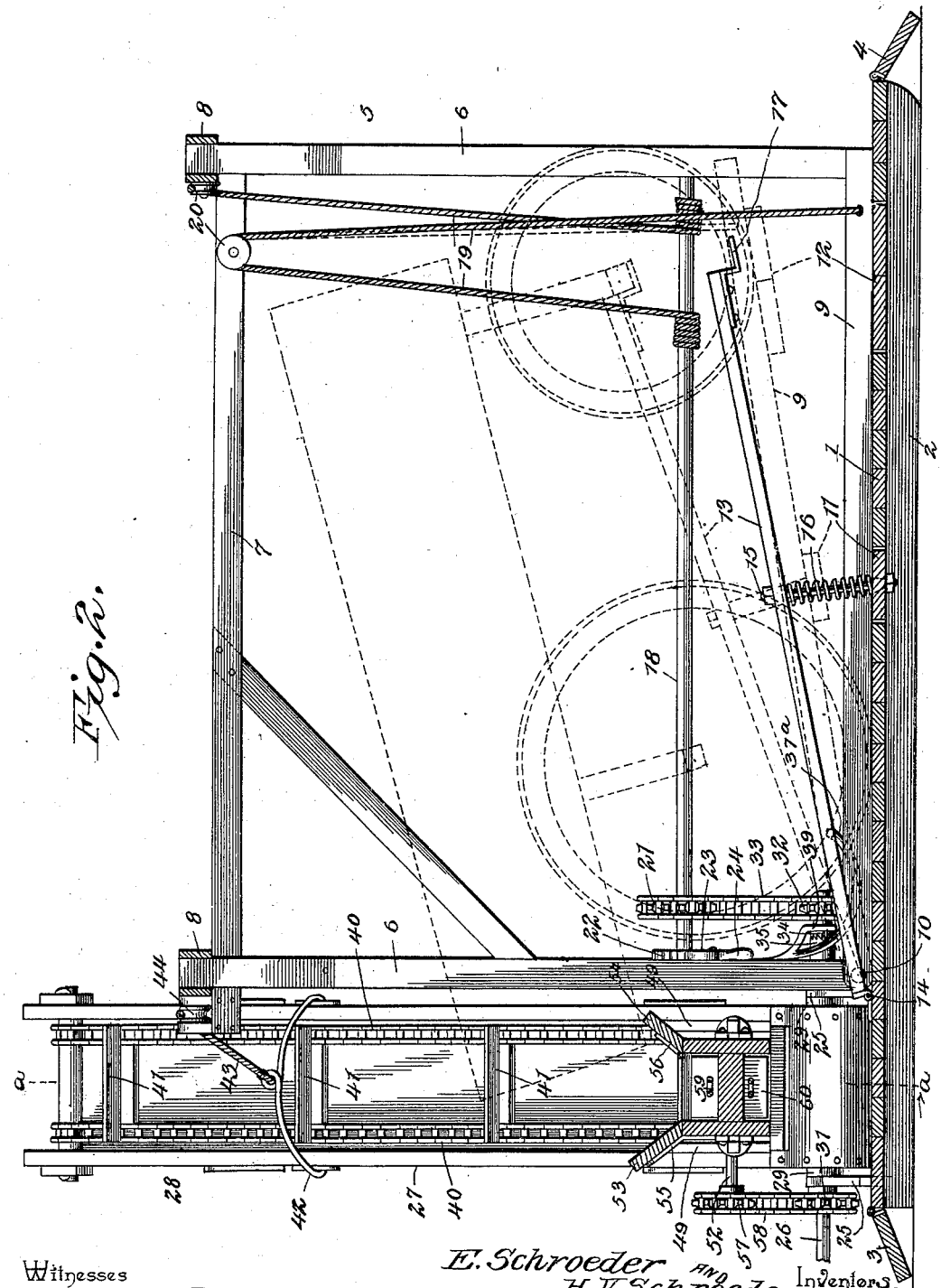

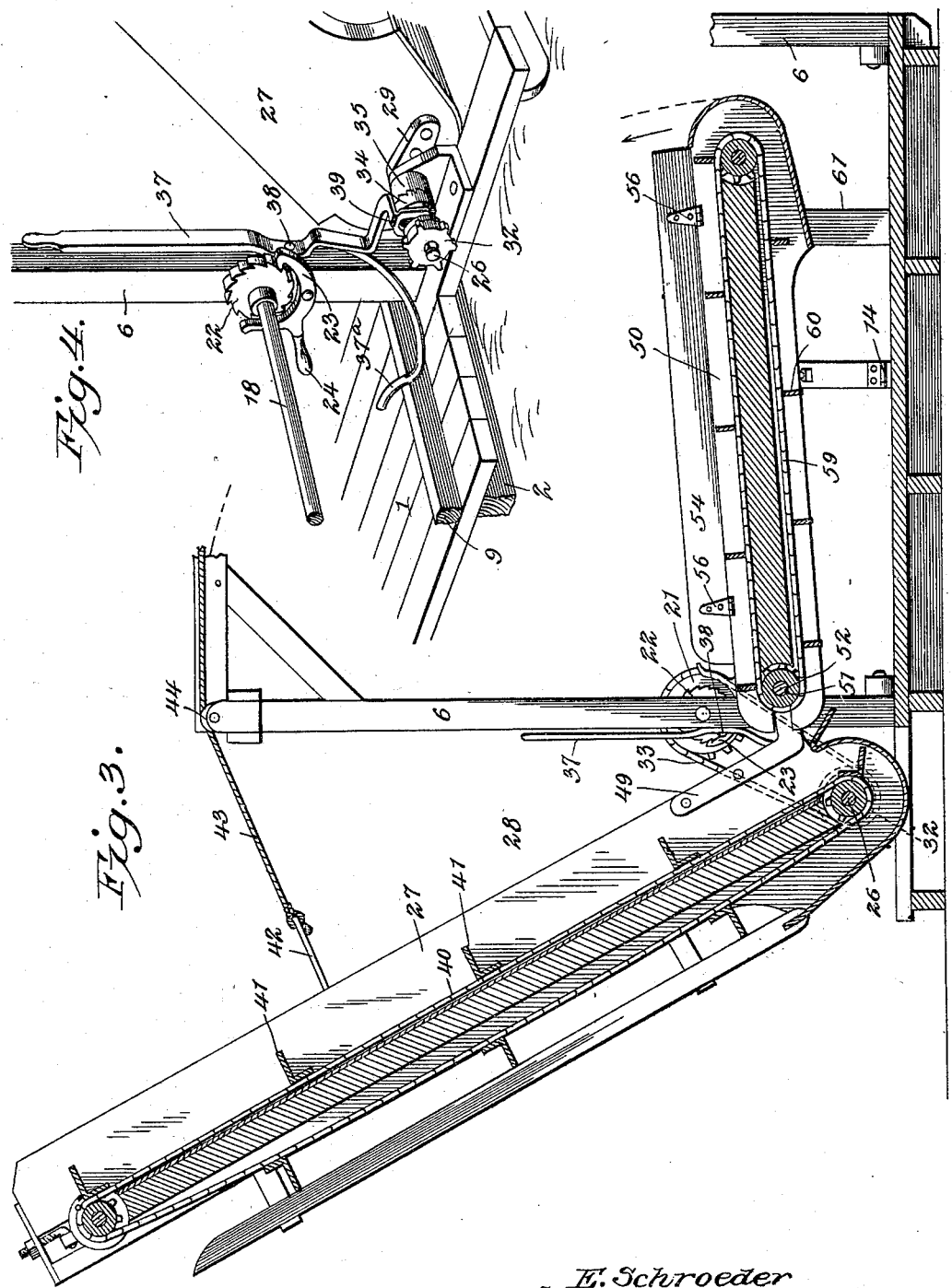

UNITED STATES PATENT OFFICE.

ERNST SCHROEDER AND HENRY V. SCHROEDER, OF MINIER, ILLINOIS.

PORTABLE GRAIN DUMP AND ELEVATOR.

SPECIFICATION forming part of Letters Patent No. 668,461, dated February 19, 1901.

Application filed November 16, 1900. Serial No. 36,785. (No model.)

*To all whom it may concern:*

Be it known that we, ERNST SCHROEDER and HENRY V. SCHROEDER, citizens of the United States, residing at Minier, in the county of Tazewell and State of Illinois, have invented a new and useful Portable Grain Dump and Elevator, of which the following is a specification.

Our invention is an improved portable grain dump and elevator adapted for unloading grain from a wagon and elevating the grain to a bin or other suitable receptacle; and it consists in the peculiar construction and combination of devices hereinafter set forth, and pointed out in the claims.

In the accompanying drawings, Figure 1 is a perspective view of a grain dump and elevator embodying our improvements. Fig. 2 is a vertical longitudinal sectional view of the same. Fig. 3 is a vertical transverse sectional view taken on a plane indicated by the line *a a* of Fig. 2. Fig. 4 is a detail perspective view of a portion of the operating mechanism.

The platform 1, which is of suitable length and breadth, is supported upon low runners 2, whereby it is adapted to be readily drawn from place to place and whereby the platform is disposed at only a slight height above the ground. At the ends of the platform are hinged skids 3 4, by means of which a loaded wagon may be readily driven onto and from the platform. Above the platform is a suitable frame 5. In the form of our invention here shown the platform comprises the vertical corner studs or posts 6 and the longitudinally and transversely disposed plates 7 8, respectively, which connect the upper ends of the posts 6 together. The said posts and plates are preferably also suitably braced, as shown. The height of the frame 5 is such as to enable a wagon to be readily driven under the same on the platform and to enable the front end of the wagon to be elevated, so as to incline the wagon-bed and discharge the load of grain by gravity therefrom.

Disposed longitudinally on the platform at the sides thereof and immediately within the corner-posts are a pair of bars 9, which are pivoted to the posts near one end of the platform, which we will call the "inner" end thereof, as at 10. The said bars 9 are connected together at a suitable distance from their inner ends by a board 11 and are connected together near their outer ends by boards 12. The said boards 11 and 12 when the bars 9 are lowered to a horizontal position constitute portions of the platform and are in the same plane therewith. The said boards 11 and 12, together with the bars 9, constitute the dump, by means of which the front end of a loaded grain-wagon may be elevated to incline the wagon and discharge the load therefrom. The distance between the boards 11 and 12 is such that when the front wheels of the wagon rest on the boards 12 the board or cross-bar 11 is immediately in advance of the rear wheels, so that when the dump is raised by the means hereinafter described the board or bars 12 in ascending elevate the front wheels and front end of the wagon, while the board or cross-bar 11 rises immediately in advance of the rear wheels thereof and forms a chock, which by bearing against the front sides of the rear wagon-wheels prevents the wagon from being drawn forward while the same is being tilted.

Longitudinally disposed on the center of the platform 1 is a chock-bar 13, which is pivotally connected or hinged at its inner end to the platform, as at 14. The said chock-bar is connected to the board or cross-bar 11 by a bolt-rod 15, which permits of vertical movement of the said chock-bar, and a coiled extensile spring 16 is placed on the said bolt-rod and bears between said chock-bar and said board or cross-bar 11, said spring serving to normally raise the chock-bar, as shown. At the free end of the chock-bar, on the under side thereof, is a hook-plate 17. The same is disposed above the boards 12, as shown. When the wagon is driven onto the platform, the running-gear thereof overrides the chock-bar 13 and depresses the free end thereof against the tension of the spring 16. When the front axle clears the free end of the chock-bar, the latter by reason of the spring 16 springs upward and engages its hook-plate 17 with the under and rear side of the front axle, thereby preventing the wagon from backing or moving rearward. It will be understood from the foregoing that the chock-bar 13 and cross-bar 11 of the dump coact to prevent the wagon from moving either forward or rearward after the same has reached the required position for tilting and while the same is tilted.

A drum-shaft 18 is journaled in bearings in the posts 6 on one side of the platform and is provided with hoisting-ropes 19, which are coiled thereon and connected to the bars 9 of the dump, the said hoisting-ropes passing over intermediate direction-sheaves 20. On the said drum-shaft are a sprocket-wheel 21 and a ratchet-wheel 22. The latter is engaged by a dog 23, which has a handle 24, by means of which it may be tripped from said ratchet-wheel.

At the inner end of the platform 1, at one side thereof, are bearing brackets or standards 25, in which is journaled a shaft 26. The said shaft passes transversely through the lower end of the trough or housing 27 of an elevator 28. Said trough or housing 27 is pivoted on said shaft 26 and has bearing-plates 29 secured on the outer sides of said trough or housing and having openings through which the said shaft 26 extends. The said shaft 26 may be driven by any suitable means, a suitable horse-power being usually employed for this purpose. Said shaft has a sprocket-wheel 31 keyed thereon on one side of the elevator-trough 28 and has a sprocket-wheel 32 loose thereon at a suitable distance from the opposite side of said elevator-trough 28, the said sprocket-wheel 32 being in line with the sprocket-wheel 21, connected thereto by an endless sprocket-chain 33, whereby power may be conveyed from said shaft 26 to the said drum-shaft 18 for the purpose of raising the dump and thereby tilting the wagon. A clutch member 34 is formed with the sprocket-wheel 32 or secured thereon and revolved therewith, and said sprocket-wheel 32 and said clutch member being loose on said shaft 26 and longitudinally movable thereon said sprocket-wheel 32 may be rotated with said shaft 26 when said clutch member 34 is engaged with a clutch member 35, which is keyed to said shaft 26. A suitable shifting lever 37 is fulcrumed to one of the posts 6, as at 38, and connected to the clutch member 34, as at 39, said lever being used for clutching the sprocket-wheel 32 with the shaft 26 or unclutching the same therefrom.

The shaft 26 actuates the endless conveyer-chain 40, which are connected together by the flights 41.

It will be understood that the elevator 27 may be raised and lowered, as may be required. The same is provided with a bail 42 and an elevating-rope 43, attached to said bail, which rope passes over direction-sheaves 44 on the frame 5 and is connected to a windlass or drum 45, which is provided with a crank 46, a ratchet-wheel 47, and a pawl 48. By this means the elevator may be raised and lowered to any required angle. Bearing-arms 49 are secured to the sides of the elevator-trough 29 near the lower end thereof and project therefrom a slight distance over one side of the platform. A conveyer-trough 50 is pivoted at one end, as at 51, on a shaft 52, which shaft has its bearings in the arms 49. Thereby the conveyer-trough is hinged or pivotally connected to the elevator-trough and is adapted to be lowered and extended across the inner end of the platform, as shown in full lines in Figs. 1, 2, and 3, and to be elevated and disposed out of the way of a wagon driven onto the platform and then relowered behind the wagon and disposed transversely across the rear end thereof and below the same, so that when the wagon is tilted the contents thereof may be discharged into the said conveyer-trough. The latter is provided with wings 53 54, which extend from the upper sides thereof. The wing 53 on the side of the trough which is farthest from the wagon is rigidly secured in position by angle-irons 55 or other suitable means. The wing 54 is secured to the side of the trough nearest the wagon by means of hinges 56. Thereby the said wing 54 may be turned outwardly in the position shown in the drawings to direct the grain as the same is discharged from the wagon into the trough of the conveyer, or the said wing 54 may be folded inward over the bottom of the conveyer-trough.

The shaft 52 is provided with a sprocket-wheel 57, which is connected to the sprocket-wheel 31 on power-shaft 26 by an endless sprocket-chain 58. The said shaft 52 actuates the endless conveyer-chains 59, provided with flights 60. It will be understood that the grain discharged into the conveyer-trough is conveyed therefrom to the lower end of the elevator-trough and carried by the said elevator to the bin or other suitable receptacle.

The conveyer-trough is provided near its free end with suitable supporting-legs 61, which support the said conveyer-trough in substantially a horizontal position transversely over the inner portion of the platform 1 when the said conveyer-trough is lowered thereon behind the wagon.

The shifting lever 37 has an arm 37ª, which is disposed above one of the bars 9 of the dump. When the latter is operated to raise the front end of a wagon, said arm 37ª is engaged by said bar 9 and the lever 37 operated to unclutch the sprocket-wheel 32, and thereby stop the operation of the drum-shaft 18.

Having thus described our invention, we claim—

1. The combination of a dump to raise the front end of a wagon and having a chock element for the rear wagon-wheels, with a spring-pressed chock-bar adapted to engage the wagon and prevent the same from being backed, substantially as described.

2. In a grain dump and elevator, the combination of an elevator, a dump to elevate the front end of a wagon, a drum-shaft, elevating-ropes connecting said drum-shaft to said dump, connections, including a clutch, between said drum-shaft and a shaft of the elevator, and a lever to operate said clutch, said lever being engaged and operated by said dump, and also adapted to be operated manually, whereby power may be conveyed from said elevator-shaft to said drum-shaft, to operate said dump, substantially as described.

3. The combination of the dump-bars pivoted at one end, the chock-bar and elevating-bars connecting said dump-bars, said chock-bar adapted to be raised in front of the rear wheels of a wagon and said elevating-bars being adapted to support and elevate the front wheels of a wagon, and the spring chock-bar adapted to engage the wagon and prevent the same from moving rearward, substantially as described.

4. In a grain dump and elevator, the combination of an elevator, a dump to incline a wagon, means to operate the dump, connections, including a clutch, between said dump-operating means and a shaft of the elevator, and a lever to operate said clutch, said lever being engaged and operated by said dump, for the purpose set forth, substantially as described.

In testimony that we claim the foregoing as our own we have hereto affixed our signatures in the presence of two witnesses.

ERNST SCHROEDER.
HENRY V. SCHROEDER.

Witnesses:
L. WEHMEIER,
VALENTIN IMIGSEN.